United States Patent [19]
Legard

[11] Patent Number: 4,778,135
[45] Date of Patent: Oct. 18, 1988

[54] WHEEL SHIELD

[76] Inventor: Brian E. Legard, Box 251 - RR 1, Hollis Center, Me. 04042

[21] Appl. No.: 2,454

[22] Filed: Jan. 12, 1987

[51] Int. Cl.$^4$ .............................................. B60T 3/04
[52] U.S. Cl. ..................................... 248/75; 248/352; 188/32
[58] Field of Search ................... 248/75, 76, 352, 351, 248/357; 188/32; D12/217

[56] References Cited

U.S. PATENT DOCUMENTS

| | | | |
|---|---|---|---|
| 1,556,327 | 10/1925 | Hughes | 118/32 |
| 1,610,112 | 12/1926 | Wendle et al. | 188/32 |
| 3,297,111 | 1/1967 | Lisboa | 188/32 |
| 3,444,963 | 5/1969 | Davis | 188/32 |
| 3,754,305 | 8/1973 | Kline | 248/75 |
| 3,800,917 | 4/1974 | Vick | 188/32 |
| 3,108,530 | 5/1974 | Jay | 188/32 |
| 4,031,983 | 6/1977 | Lentini | 188/32 |

FOREIGN PATENT DOCUMENTS 1305914  8/1962  France ................................... 188/32

Primary Examiner—Ramon S. Britts
Assistant Examiner—Karen J. Chotkowski
Attorney, Agent, or Firm—William Nitkin

[57] ABSTRACT

A device for preventing a hose/cord from being caught between a wheel and ground or from being caught between the wheel and the body of a wheeled vehicle including a frusto-conical member having an opening defined in a side thereof for insertion of the wheel therein, such conical member contacting the ground in front of the wheel, presenting a sloped surface upward and toward the wheel for the hose/cord to move against to prevent the hose/cord from passing and catching between the wheel and the ground and a forwardly protruding lip at the top of the conical portion to prevent the hose/cord from catching between the wheel and portions of the vehicle.

5 Claims, 1 Drawing Sheet

WHEEL SHIELD

BACKGROUND OF THE INVENTION

1. Field of the Invention

The device of this invention relates to apparatuses that are removably positioned against the wheels of vehicles to prevent hoses, cords and the like from getting caught between the wheels and the ground or the upper structure of the vehicle.

2. Description of the Prior Art

In the prior art when one utilizes a hose such as might contain air, water, steam or the like or cord such as containing electrical wires near a wheeled vehicle and such hose or cord passes between the wheel of the vehicle and the ground, it frequently gets caught or jammed between the wheel and the ground and often will not move further. Such catching can also occur at a higher point along the wheel because of the hose/cord coming in contact with the wheel and riding up thereon to contact mudflaps, spoilers, suspension units and the like before becoming jammed. Further, when the hose/cord comes in contact with a tire composed of a rubber-like material, friction occurs between the hose/cord which often can also be composed of similar rubber-like material. The wedging of such hose/cord can cause great inconvenience to the user of such hose/cord. Also, if there are any loops, twists, junctions or other cross-sectional distensions of the hose/cord, the problem is aggravated. To an individual desiring to paint a vehicle using a pressurized air or paint hose, having the hose get caught in the "nip" between the tire and the ground can cause a major problem as he will not be able to maneuver the paint sprayer smoothly and the paint job could be spoiled. Time and expense would then have to be expended to correct any resulting painting defects. In the prior art, when painting a vehicle one would usually allow for sufficient slack in the hose to move the spray nozzle smoothly back and forth to apply paint to the surface and any catching of the hose could cause a stoppage of that smooth movement. Currently, in order to dislodge a hose that has become caught in the above-mentioned nip, the worker will throw the hose, such action called "slatting," attempting to dislodge it and advance the hose around the wheel to gain additional slack. This slatting action can cause dust, dirt and water from the floor to be thrown directly onto the newly painted surface or into the air from whence it can settle onto said newly painted surface. Slatting can also dislodge tire paint covers which are usually fabric or paper members that cover the tires and wheel rims to protect them from paint overspray. Also such slatting will often cause the hose itself to contact and mar a newly painted surface.

SUMMARY OF THE INVENTION

It is an object of this invention to provide a device that will prevent a hose/cord from being caught in the nip between a motor vehicle tire and the ground and also from such hose/cord being caught between the tire and other parts of the vehicle.

It is a further object of this invention to smoothly guide the passage of the hose/cord on the floor when it comes near the area of the tire and to prevent it from climbing up the tire or sidewall and getting caught between the tire and a higher portion of the vehicle.

It is a further object of this invention that such device be easily installed and quickly removed and require little, if any, adjustment. It is yet still a further object that such device be inexpensive to produce, lightweight, firm, durable, maintenance-free and impervious to paints, solvents, oils, gasoline and the like. Such device can be manufactured to fit all commonly encountered sizes of tires, and be easy to clean and store.

The wheel shield of this invention is positioned against a vehicle's wheel usually with a tire thereon and provides a surface on the ground against which a hose/cord can pass, preventing the hose/cord from being caught in the nip between the wheel/tire and the ground. The device of this invention slips over the tire and catches thereon by structures as described below and also can be utilized on any tire whether it be installed on the left or right side of the vehicle or the front of rear of the vehicle, since the device universally fits on any tire or wheel and requires no adjustment once it has been installed. The design of the wheel shield of this invention essentially has two arms extending along the sides of the tire on the ground such arms continuing to a base with a partially open, generally hollow upwardly-extending frusto-conical section, the base extending outward away from and around the outward portion of the face of the tire forming a surface on which the hose/cord can easily move against without getting caught or even being able to get near the contact area of the tire to the ground. The front conical section's surface rises upwards and toward the tire approximately 8-10 inches and then the device's shape protrudes forward to form a forwardly extending tongue member such that if a hose is run up the front of the conical section, it is then caught by such tongue member and prevented from further upward rising along the surface so that it will not get caught between the wheel and an upper portion of the vehicle's structure. The device in one embodiment can have means so that its arm members can open apart slightly and then be closed around the inside and outside of the bottom of the tire, and the hollow area of the semi-conical section can be pushed up against the tire so that the lower protruding base on the ground will contact and prevent any hose/cord from getting caught under the tire.

The device can be manufactured in a variety of ways, such as from flat stock such as metal, board or equivalent formed into the shape of the invention. It also can be molded by injection or vacuum techniques out of a plastic material or equivalent. It is desirable that the wheel shield of this invention be durable and smooth such as if it is made from a low-density polyethylene or equivalent so that any hose/cord moves freely thereagainst.

DESCRIPTION OF THE PREFERRED EMBODIMENT(S)

Figure 1:
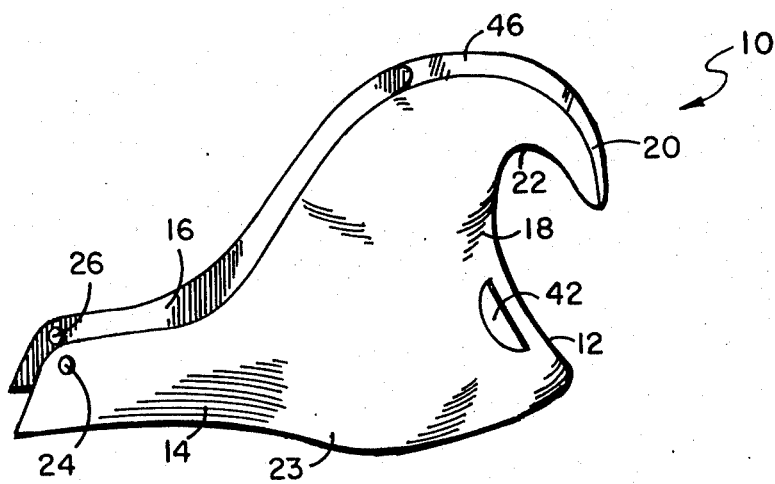
FIG. 1 is a side perspective view of the wheel shield of this invention.

FIG. 1 illustrates a side perspective view of the wheel shield 10 of this invention showing its basic structure.

Figure 2:
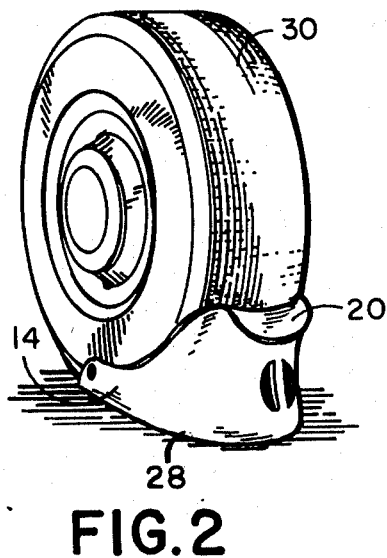
FIG. 2 illustrates a front perspective view of the device installed on a tire.
Figure 4:
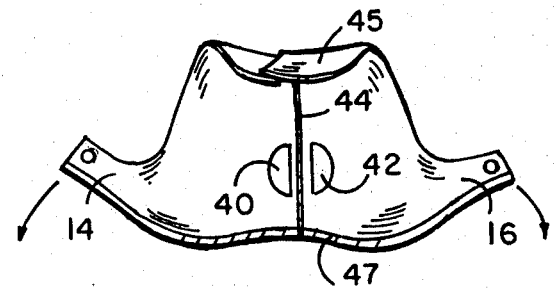
FIG. 4 illustrates a front elevational view of an alternate embodiment of the device of this invention with the arms thereof spread apart.
Figure 3:
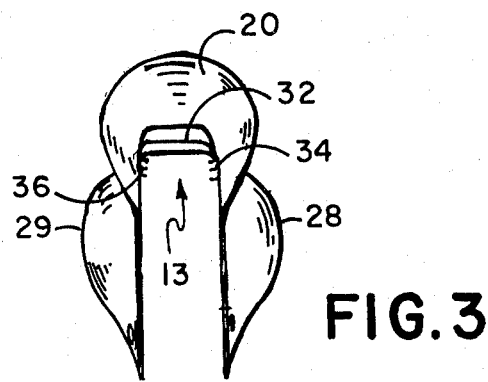
FIG. 3 illustrates a rear view of the device of this invention.

Seen in this view is base 12 extending in a semi-conical form downward away from the hollow area forming tire receipt area 13 in which area tire 30 of a motor vehicle is positioned between arms 14 and 16 as seen in FIG. 2. Arms 14 and 16 are generally flat and are adapted to contact the sides of the tires on each side thereof to help hold the unit in place. Apertures 24 and 26 can be provided in arms 14 and 16, respectively for easy grasping of each arm so that they can be moved laterally away from the tire for removal or installation of the unit against the tire. Base 12 extends laterally on each side toward the arms forming side extension protrusion 28 with another side extension protrusion 29 on the other side not seen in FIG. 1 but which is of similar symmetrical construction as seen in FIG. 3. The angle of the semi-conical structure allows any hose/cord coming in contact with base 12 to rise upwards on the device and to prevent the hose/cord from rising so far upwards that it becomes caught between the tire and the structure of the vehicle. Forward curve 22 is provided forming lip 20 in which the hose can rise up into and be slideably retained therein. When the hose reaches uppermost point of forward curve 22, it is retained by the bottom portion of lip 20 therein and is prevented from rising further but is still movable around the vehicle. Although the device, as mentioned above, can be manufactured and pressed from a flat stock, a preferred method of manufacture is to mold it from a plastic material. In one embodiment the device can be made of two pieces, each forming a side of the device or the device can be made of unitary construction. The device has means for releasable attachment to the tire as seen in FIG. 3 showing spring member 32 extending around the inside of the semi-conical section with tire catch members 34 and 36 having small prongs which when urged against a tire by spring member 32, will catch thereon. The spring member and catch members should have sufficient strength to grasp inward against the tire and hold the wheel shield in place when the shield is pushed against the tire which fits within tire receipt area 13 within the device. In this manner by spreading arms 14 and 16 apart, one moves the attached tire catch members 34 and 36 away from their engagement with the tire so as to release the device from the tire. The device can then be pulled forward and quickly and easily removed from the tire. To install the device if of unitary construction, one can quickly and easily spread arms 14 and 16 slightly so that tire catch members 34 and 36 pass around the rubber on the sides of the tire and catch thereagainst. If the device is of two-piece construction or of a single piece unit with a hinge member formed therein such as seen in FIG. 4, an aperture such as aperture 42 can be provided on each side of the device to form handle 40 so that the device can be easily grasped thereby and maneuvered. Hinge 44 between the two parts of the device can be provided so that the device can be opened and closed by the sideward movement of arms 14 and 16. Flexible construction materials will allow installation and removal of the device while other stiffer construction materials may require such hinge. A small overlap 45 as seen at the top of hinge 44 in FIG. 4 can be provided to allow lip 20 to open and close with the movement of the hinge. When open, as seen in FIG. 4, one side of overlap 45 can slide over the other and when closed around tire 30, no space will be left open in lip 20.

It should be noted that a variety of different profiles or slopes can be incorporated in the device of this invention but the basic idea is to provide a lower bottom protruding slope to the ground away from the tire adapted so that its base meets with the ground forming an angle greater than 90 degrees toward the tire so that any hose coming in contact with it will slide therearound. Further lip 20 at the top can also be provided in other configurations but its basic structure must be to prevent the hose's further upward movement up the front slope 18 of the device. Some embodiments of the device may not need springs or tire catch members since the material of construction itself may have enough resilience to retain a snug fit when installed on the tire. Also such handles and hinges are strictly optional and are shown as alternate embodiments. Lip 20 can be formed of either solid or hollow construction and can have a structure incorporating top member 46 for strength joining the upper sides of the lip's curved portion at its top above the bottom curve which structure acts to reinforce the device. A reinforcing band 47 can also be utilized at the front of base 12 of the unit extending therearound for additional strength in conjunction with the top spring member 32 which also acts as a reinforcement band with its tire catch members, the prongs of which can aim forward so that they securely engage against the tire. The need for such reinforcements will depend very much on the materials being used and certainly to be considered within the spirit and scope of the invention to use flexible materials rather than stiffer materials in the construction of the device of this invention.

Although the present invention has been described with reference to particular embodiments, it will be apparent to those skilled in the art that variations and modifications can be substituted therefor without departing from the principles and spirit of the invention.

I claim:

1. A wheel shield for use on a wheel of a wheeled vehicle with said wheel resting on the ground, comprising:

means to prevent a hose/cord from being caught between said wheel and said ground including a frusto-conical member having an opening defined in a side thereof for insertion of said wheel therein, said frusto-conical member having a base contacting said ground in front of said wheel, presenting a sloped surface upward and toward said wheel for a hose/cord to move against to prevent said hose/cord from passing and catching between said wheel and said ground;

means to prevent said hose/cord from being caught between said wheel and the body of said wheeled vehicle including a forwardly protruding lip at the top of said frusto-conical portion said lip extending forward a sufficient distance to catch said hose/cord and prevent it from further upward rising but yet still allowing said hose/cord to move under said lip as said cord/hose is being pulled around said vehicle;

a first substantially planar arm extending rearwardly from one side of the base of said frusto-conical member beside said opening where said frusto-conical member contacts said ground, said first arm extending along said ground at the side of said wheel; and a second substantially planar arm extending rearwardly from the other side of the base of said frusto-conical member beside said opening where said frusto-conical member contacts said ground, said second arm extending along said ground at the side of said wheel.

2. The device of claim 1 further including at least one aperture defined at the upper end of each of said first and second arms adapted for easy grasping thereof.

3. The device of claim 2 further including means to urge against and releasably grasp said wheel disposed on the inside of said frusto-conical member adapted to assist in holding said device in place when in use.

4. The device of claim 3 further including:
hinge means extending up a central portion of the front of said frusto-conical member adapted to facilitate the spreading of said first and second arms.

5. The device of claim 4 further including dual apertures defined in said conical member with a strip of said conical member therebetween to form a handle for holding and manipulating said device.

* * * * *